US008417225B2

(12) United States Patent
Mock et al.

(10) Patent No.: US 8,417,225 B2
(45) Date of Patent: Apr. 9, 2013

(54) METHOD FOR COORDINATING THE SHARING OF CONTACT INFORMATION BETWEEN A DIRECTORY TERMINAL AND A PORTABLE COMMUNICATION DEVICE, AS WELL AS PROVIDING ENHANCED USER INTERFACE CONTEXT FEATURES

(75) Inventors: Von A. Mock, Boynton Beach, FL (US); Jorge L. Perdomo, Boca Raton, FL (US)

(73) Assignee: Motorola Mobility LLC, Libertyville, IL (US)

( * ) Notice: Subject to any disclaimer, the term of this patent is extended or adjusted under 35 U.S.C. 154(b) by 1338 days.

(21) Appl. No.: 11/641,391

(22) Filed: Dec. 19, 2006

(65) Prior Publication Data

US 2008/0147685 A1   Jun. 19, 2008

(51) Int. Cl.
*H04W 3/42* (2006.01)

(52) U.S. Cl. ..... 455/414.1; 455/567; 455/69; 455/257.1; 455/574; 379/212.01; 379/211.027; 379/114.01; 379/142.17; 379/218.01; 370/318; 370/400

(58) Field of Classification Search .................. 455/466, 455/414.1, 419, 41.2, 41.1, 412.1, 550.1, 455/566, 564, 418, 502, 557, 402.2, 404.1, 455/456.1, 425, 415, 417, 456.11, 412.2, 455/456.2, 411; 370/449, 352, 314, 392, 370/338; 709/201; 379/142.02

See application file for complete search history.

(56) References Cited

U.S. PATENT DOCUMENTS

| | | | | |
|---|---|---|---|---|
| 5,440,559 A * | 8/1995 | Gaskill | ..... | 370/314 |
| 6,256,008 B1 | 7/2001 | Sparks et al. | | |
| 7,302,272 B2 * | 11/2007 | Ackley | ..... | 455/466 |
| 7,668,507 B2 * | 2/2010 | Ramsten et al. | ..... | 455/41.1 |
| 7,673,327 B1 * | 3/2010 | Polis et al. | ..... | 726/5 |
| 7,933,587 B1 * | 4/2011 | Swan | ..... | 455/412.1 |
| 2002/0123336 A1 * | 9/2002 | Kamada | ..... | 455/420 |
| 2004/0077313 A1 * | 4/2004 | Oba et al. | ..... | 455/41.2 |
| 2004/0221297 A1 | 11/2004 | Greve et al. | | |
| 2004/0235520 A1 | 11/2004 | Cadiz et al. | | |
| 2005/0114503 A1 | 5/2005 | Ruetschi et al. | | |
| 2005/0127167 A1 * | 6/2005 | Nakajima | ..... | 235/380 |
| 2005/0143135 A1 * | 6/2005 | Brems et al. | ..... | 455/564 |
| 2005/0288035 A1 * | 12/2005 | Wang | ..... | 455/456.1 |
| 2006/0048064 A1 | 3/2006 | Vronay | | |
| 2006/0129504 A1 * | 6/2006 | Nakajima | ..... | 705/75 |
| 2006/0135142 A1 * | 6/2006 | Repka | ..... | 455/418 |
| 2007/0104180 A1 * | 5/2007 | Aizu et al. | ..... | 370/352 |
| 2007/0112964 A1 * | 5/2007 | Guedalia et al. | ..... | 709/227 |
| 2007/0225018 A1 * | 9/2007 | Cho | ..... | 455/456.1 |

(Continued)

*Primary Examiner* — Joseph Arevalo (57) ABSTRACT

A method for coordinating the sharing of contacts between a directory terminal (104) and a portable communication device (102) is implemented in one embodiment when the directory terminal receives from the portable device a request to conduct a directory sharing session and a communication device identifier. The directory terminal retrieves screen interface information associated with the identifier and renders a user interface on a display screen (101) of the directory terminal based on the retrieved information. The directory terminal receives a first set of contact records from the portable communication device, wherein each contact record includes a contact name and at least one contact entry. The directory terminal searches a second set of contact records to find contact records containing contact names included in contact records of the first set. Contact entries for common contact records are conveyed to the portable communication device for automatic association with the first set.

22 Claims, 7 Drawing Sheets

U.S. PATENT DOCUMENTS

| | | | |
|---|---|---|---|
| 2007/0232335 A1* | 10/2007 | Harada et al. | 455/466 |
| 2007/0268789 A1* | 11/2007 | Takamune | 369/29.02 |
| 2007/0293193 A1* | 12/2007 | Ramsten et al. | 455/411 |
| 2008/0059341 A1* | 3/2008 | Narayanaswami et al. | 705/28 |
| 2008/0115087 A1* | 5/2008 | Rollin et al. | 715/811 |
| 2008/0188207 A1* | 8/2008 | Lee | 455/414.1 |
| 2008/0281829 A1* | 11/2008 | Marino | 707/10 |
| 2010/0077451 A1* | 3/2010 | Fujimoto et al. | 726/3 |

* cited by examiner

METHOD FOR COORDINATING THE SHARING OF CONTACT INFORMATION BETWEEN A DIRECTORY TERMINAL AND A PORTABLE COMMUNICATION DEVICE, AS WELL AS PROVIDING ENHANCED USER INTERFACE CONTEXT FEATURES

FIELD OF THE INVENTION

The present invention relates generally to the field of wireless communication systems and, more particularly, to a method for coordinating the sharing of contact information between a directory terminal and a portable communication device, and providing enhanced user interface context features.

BACKGROUND OF THE INVENTION

Many corporate facilities, shopping plazas, or other public buildings contain a directory terminal or kiosk in a common area open to the public to provide contact information to visitors concerning the businesses, residents, or employees occupying that location. For example, a directory kiosk can be located in the lobby of an office building and may include a listing of all occupants and employees of that building, along with a corresponding phone number for each person or business listed. When a visitor enters the building, the visitor generally consults the kiosk directory to find information for the occupant he or she is there to see. The visitor can then contact the occupant by manually dialing the number found in the directory.

However, each kiosk typically displays a unique user interface. Because the visitor is usually unfamiliar with the particular user interface, the menu listings may be quite confusing when the visitor is attempting to find information. This problem is further compounded when the visitor needs to find contact information quickly and can result in unnecessary frustration.

Additionally, the visitor may already have certain contact information for the particular occupant stored in the mobile phone. However, if there is any additional information listed in the directory that the mobile phone did not previously contain, the visitor must enter the new information into his or her phone manually in order to update the occupant's contact information.

Therefore, a need exists for, among other things, a method for coordinating the sharing of contact information between a directory terminal and a portable communication device, and providing enhanced user interface or display screen context features that overcomes the shortcomings of the prior art.

SUMMARY

Generally, the present invention encompasses a method for coordinating the sharing of one or more contacts between a directory terminal and a portable communication device, as well as optionally providing enhanced user interface or display screen context features for a user of the directory terminal and/or the portable communication device. In one embodiment, the directory terminal receives a request from the portable communication device (e.g., over a short-range wireless link) to conduct a directory sharing session. The request includes a communication device identifier, which is at least associated with a manufacturer of the portable communication device and, more preferably, is further associated with a model number of the portable communication device. Responsive to the request, the directory sharing session is established and the directory terminal retrieves (e.g., from a remote database or server) display screen interface information associated with the communication device identifier. Based on the retrieved display screen interface information, the display terminal renders a user interface on the display screen of the directory terminal, wherein the user interface has substantially the same "look and feel" or context of the user interface for the portable communication device.

In another embodiment, the directory terminal receives a first set of contact records stored in a memory of the portable communication device. Each contact record is associated with a corresponding one of the plurality of contacts, and each contact record includes a contact name and at least one contact entry. The first set of contact records is displayed on the display screen of the directory terminal for viewing by the user of the directory terminal. Each contact entry may be a telephone number, an email address, an instant messaging address, a pager number, a group identifier, a universal fleet member identifier (UFMI), or a dispatch number.

In another embodiment, the first set of contact records is combined with a second set of contacts records stored in a memory accessible by the directory terminal to form a combined set of contact records which is displayed on the display screen of the directory terminal. A selection of a displayed contact entry is received from a user of the directory terminal. The directory terminal then initiates a communication with the contact corresponding to the selected contact entry using the selected contact entry. Additionally, the directory terminal may further capture data identifying the user of the directory terminal and forward the captured data to the contact corresponding to the selected contact entry. The captured data may be a name, a telephone number, textual information, audio information, or video information (e.g., a digital photograph taken by a camera embedded within or attached to the directory terminal).

In another embodiment, a second set of contact records stored in a memory accessible by the directory terminal is searched to find contact records containing a contact name corresponding to a contact name contained in at least one contact record of the first set of contact records. Any contact record from the first set of contact records including a contact name for which there is no corresponding contact name included in any contact record of the second set of contact records is excluded from display.

In another embodiment, a second set of contact records stored in a memory accessible by the directory terminal is searched to find contact records containing a contact name corresponding to a contact name contained in at least one contact record of the first set of contact records. The directory terminal then displays all the contact records in the second set of contact records for which contact names of the records match contact names of the first set of contact records. The contact entry for a particular record may be displayed as an icon to ensure privacy of the contact information.

In the event that the user desires to contact an individual whose contact name is listed in the contact records displayed by the directory terminal, the directory terminal receives a selection of a displayed contact entry associated with the desired contact name from the user of the directory terminal (who, in most circumstances, is also the user of the portable communication device). The directory terminal then initiates a communication with the contact corresponding to the selected contact entry in response to selection of the contact entry. The communication may be a telephone call, a dispatch call, a page, a text message, an email message, an instant message, or a multi-media message.

In another embodiment, at least one contact entry contained in the contact records of the second set of contact records may be sent to the portable communication device, together with a usage control code that establishes the duration of accessibility for the sent contact entry by the portable communication device. The duration of accessibility may be an unlimited time, a time limited to a duration of the present directory sharing session, a predetermined length of time, or a time limited to whenever the portable wireless device is in communication with the directory terminal.

In another embodiment, a directory sharing session between a directory terminal and a portable communication device is established to coordinate the sharing of a plurality of contacts. In this embodiment, the portable communication device conveys a communication device identifier associated therewith to a directory terminal (e.g., in a directory sharing session request or otherwise). Additionally, the portable communication device sends the directory terminal a first set of contact records stored in a memory of the portable communication device. Each contact record is associated with a corresponding one of the plurality of contacts and each contact record contains a contact name and at least one contact entry. The portable communication device receives at least one contact record contained in a second set of contact records stored in a memory accessible by the directory terminal. The received contact record may include a contact name corresponding to a contact name contained in a contact record of the first set of contact records. If the received contact record includes such a contact name, the portable communication device, in one embodiment, automatically associates the contact entry in the received contact record with the contact record in the first set of contact records containing the corresponding contact name. The portable communication device then optionally stores the contact entry in the contact record of the first set of contact records containing the corresponding contact name. In other words, the portable communication device may update the contact record for a particular contact based on information for the contact received from the memory accessible by the directory terminal.

The portable communication device optionally displays the received contact record on a display screen of the portable communication device. Additionally, the portable communication device may further receive a usage control code associated with the received contact entry that establishes the duration of accessibility for the received contact entry. The duration of accessibility may be an unlimited time, a time limited to a duration of the present directory sharing session, a predetermined length of time, or a time limited to whenever the portable wireless device is in communication with the directory terminal.

After the received contact record has been displayed, the portable communication device receives a selection of a contact entry in the displayed record from a user of the portable communication device and, in response thereto, initiates a communication with the contact corresponding to the selected contact entry.

DETAILED DESCRIPTION

Before describing in detail exemplary embodiments that are in accordance with the present invention, it should be observed that the embodiments reside primarily in combinations of apparatus components and processing steps related to implementing a method for coordinating the sharing of one or more contacts between a directory terminal and a portable communication device, as well as providing enhanced user interface context features for a user of the directory terminal and/or the portable communication device. Accordingly, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms, such as "first" and "second," "top" and "bottom," and the like, are used solely to distinguish one entity or element from another entity or element without necessarily requiring or implying any physical or logical relationship or order between such entities or elements. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

The terms "wireless communication device," "portable communication device," and "mobile communication device" are used interchangeably herein and are intended to broadly cover many different types of devices that can wirelessly receive signals, and optionally can wirelessly transmit signals, and may also operate in a wireless communication system. For example, and not by way of limitation, a wireless, portable or mobile communication device may include any one or a combination of the following: a cellular telephone, a mobile phone, a smart phone, a two-way radio, a two-way pager, a wireless messaging device, a laptop/computer, a personal digital assistant (PDA), a wireless email device, a portable gaming device including a built-in wireless modem, and the like. The term "dispatch number" includes any identification sequence used to identify a wireless communication device with any "push-to-talk" services, including, but not limited to, Voice-over-IP applications.

It will be appreciated that embodiments of the invention described herein may be comprised of one or more conventional processors and unique stored program instructions that control the one or more processors to implement, in conjunction with certain non-processor circuits, some, most, or all of the functions for coordinating the sharing of contacts between a directory terminal and a portable communication device as described herein. The non-processor circuits may include, but are not limited to, a radio receiver, a radio transmitter, signal drivers, clock circuits, power source circuits, and user input devices. As such, the functions performed by these processor and/or non-processor circuits may be interpreted or referred to herein as steps of a method to coordinate the sharing of contacts between a directory terminal and a portable communication device, as disclosed and claimed herein. Alternatively, some or all the recited functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions are described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) without undue experimentation.

Many corporate facilities and publicly accessible buildings contain a directory terminal or kiosk that is located in a common area and stores individual contact information for each occupant or employee of the building or facility. The stored contact information is generally searchable based on an identification (e.g., last name) of the building occupant. One embodiment of the present invention enables additional features for a directory kiosk by providing a seamless exchange of contact information between the directory kiosk or terminal and a portable communication device, such as a mobile phone with Bluetooth® capabilities or a handheld gaming device operating over a wireless communication system (e.g., a system implementing any of the IEEE 802.11 or IEEE 802.16 family of standards). By linking a visitor's portable communication device with the directory terminal, the user interface of the directory terminal may be custom rendered to have a similar look and feel to that of the visitor's personal communication device. Because the user interface is already familiar to the visitor, the visitor need not waste time and incur frustration trying to figure out how to operate the kiosk. Additionally, in accordance with another embodiment of the present invention, the portable communication device may update its contact information relating to one or more contacts for which contact records are stored in a memory accessible by the directory terminal by receiving updated contact entries from the remote memory (e.g., database) either indirectly through the directory terminal or directly in response to being advised by the directory terminal that one or more of the contact entries for a particular contact record stored in a memory of or connected to the portable device is missing or in error. Further, enhanced identification information about a user of the directory terminal (e.g., a visitor to an office building), such as a picture, a video segment, or an audio recording, may be captured by the directory terminal or a device coupled thereto and included in a communication from the directory terminal to a selected recipient (e.g., an occupant of the building).

Figure 1:
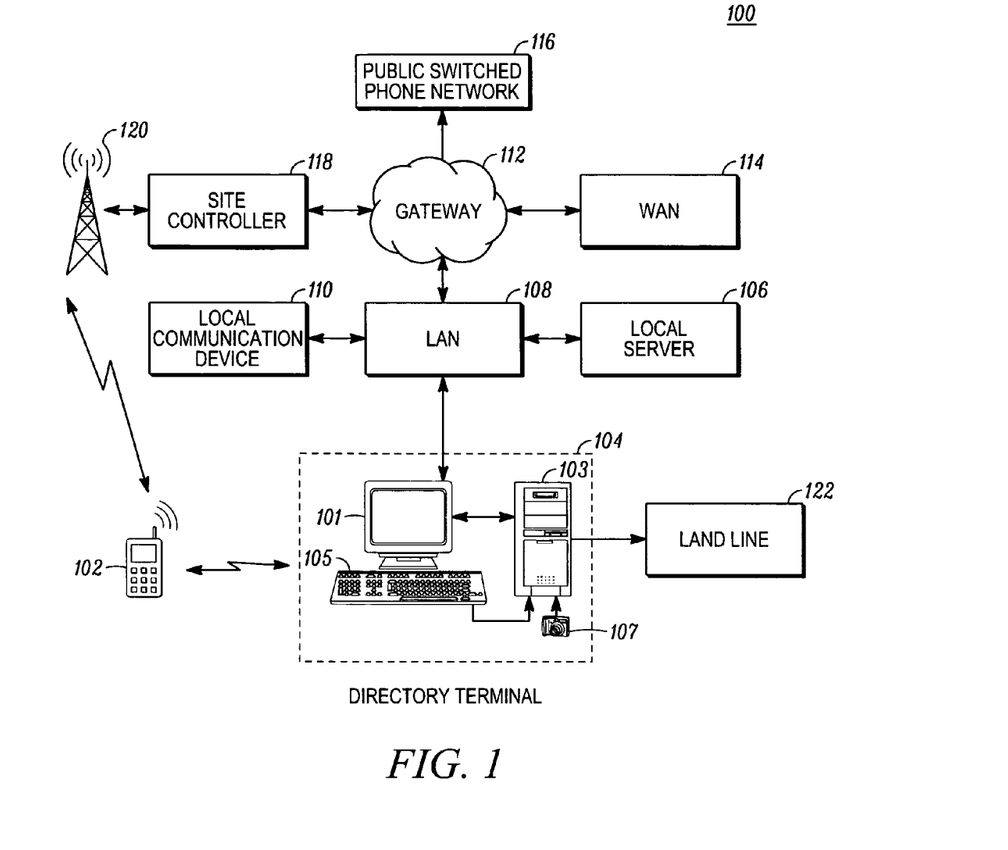
FIG. 1 is a block diagram of an exemplary communication system in accordance with one embodiment of the present invention.

The present invention can be more readily understood with reference to FIGS. 1-7, in which like reference numerals designate like items. FIG. 1 depicts an exemplary wireless communication system 100 in accordance with one embodiment of the present invention. The depicted wireless communication system 100 includes at least one or more portable communication devices 102 (one shown) and a directory terminal 104. The wireless communication system 100 connects the portable communication device 102 to other wireless communication devices and/or to other networks, including wide area networks 114, such as the Internet, a public switched telephone network (PSTN) 116, and the like, via at least one base station 120. The base station 120 is operated by a site controller 118, which connects to other networks via a gateway 112, mobile switching controller, or other conventional routing and/or switching equipment. The directory terminal 104 is preferably accessible to a local server 106 and/or a local communication device 110 (e.g., a telephone or personal computer) via a local area network (LAN) access point 108. The directory terminal 104 may also be accessible to a remote server via, for example, the LAN access point 108, the gateway 112, and the WAN 114. Additionally, the directory terminal 114 may access the WAN 114 and place telephone calls through a wired land line 112.

The wireless communication system 100 may comprise, inter alia, a mobile phone network, a mobile text messaging device network, a wireless local area network (WLAN), a pager network, or the like. In one embodiment, the portable communication device 102 is configured with wireless technology that allows the device 102 to communicate directly with the directory terminal 104 or other wireless communication devices using the Bluetooth® short-range wireless transmission protocol, the Infrared Data Association (IrDA) protocol, or any other communication standards or protocols, including, but not limited to, the IEEE 802.11 (Wi-Fi) family of standards and/or the IEEE 802.16 (Wi-MAX) family of standards.

In accordance with one embodiment of the present invention, the directory terminal 104 includes a computer system 103 with a user interface and a display screen 101 for presenting information to a user. The display screen 101 preferably comprises touch screen capabilities, thereby incorporating the user interface and allowing a user to enter a requested operation by pressing the screen directly. Additionally or alternatively, the directory terminal 104 may include other user interface devices, such as a keyboard 105 or other input device (e.g., a mouse, a microphone, or a touchpad) (not shown) to facilitate user requests or inquiries. The directory terminal 104 may also include a camera 107 for capturing video or photographic data.

In one embodiment, the directory terminal 104 is communicatively coupled to the LAN access point 108 via a network interface card (not shown) which may be wired, wireless, or any combination thereof. Additionally, the LAN access point 108 may provide connectivity to the local server 106, which stores a local contacts database.

The communications standard or protocol of the wireless communication system 100 may include any conventional protocol or multiple access technique, including, without limitation, Code Division Multiple Access (CDMA), Time Division Multiple Access (TDMA), Global System for Mobile Communications (GSM), Enhanced Data GSM Environment (EDGE), General Packet Radio Service (GPRS), Frequency Division Multiple Access (FDMA), or Orthogonal Frequency Division Multiplexing (OFDM). Additionally, the wireless communication system 100 may further utilize media messaging standards, such as, Short Message Service (SMS), Enhanced Messaging Service (EMS), Multimedia Messaging Service (MMS), or any other protocols for conveying text or video messages. The wireless communication system 100 may further facilitate push-to-talk or dispatch over cellular communications between capable wireless communication devices.

The wireless communication system 100 supports any number of wireless communication devices 102 and/or wireline communication devices (e.g., PCs). For example, the wireless communication system 100 of FIG. 1 supports mobile telephones, smart phones, text messaging devices, PDAs, handheld computers, pagers, beepers, wireless communication cards, handheld game systems incorporating wireless access technology, or the like. A smart phone is a mobile telephone that has additional application processing capabilities. For example, a smart phone may include a combination of 1) a pocket PC, handheld PC, palm top PC, or PDA, and 2) a mobile telephone.

Figure 2:
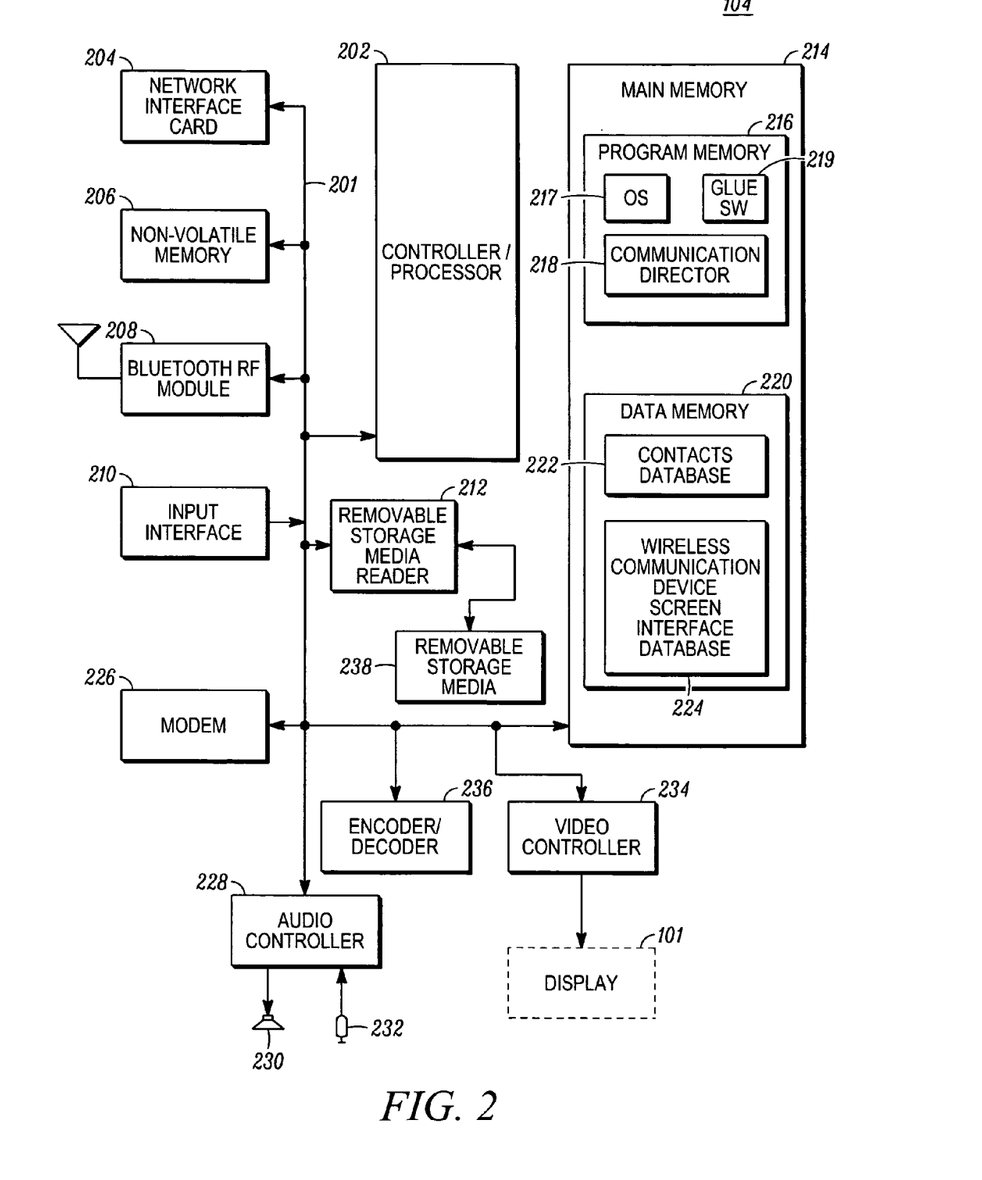
FIG. 2 is a block diagram illustrating a directory terminal of the system of FIG. 1, according to an exemplary embodiment of the present invention.

Referring now to FIG. 2, an electrical block diagram of an exemplary directory terminal 104, according to one embodiment of the present invention, is shown in more detail. The depicted directory terminal 104 includes a controller/processor 202, which processes instructions, performs calculations, and controls the flow of information through the directory terminal 104 according to computer instructions stored in program memory 216. The controller/processor 202, in one embodiment, is communicatively coupled to other components of the directory terminal 104 via an interface bus 201.

The controller/processor 202 is communicatively coupled to a non-volatile memory 206 and a main memory 214. In one embodiment, the main memory 214 includes the program memory 216 and a data memory 220. In one embodiment, the program memory 216 contains a communication director 218, an operating system platform 217, and glue software 219. The operating system platform 217 manages resources, such as the data stored in data memory 220, schedules tasks, and processes the operation of the communication director 218, as discussed in greater detail below. The operating system platform 217 also manages a graphical user display interface rendered according to information retained in a wireless communication device screen interface database 224, a user input device interface 210 that receives inputs from a keyboard 105, a mouse (not shown), a touchscreen or any other user interface device, and a network interface card 204 that communicates with other devices through the LAN access point 108. Additionally, the operating system platform 217 further manages many other basic tasks of the directory terminal 104 in a manner well known to those of ordinary skill in the art.

In one embodiment, the glue software 219 includes drivers, protocol stacks, and low level application programming interfaces (APIs). The glue software 219 provides basic functional components for use by the operating system platform 217 and by compatible applications that run on the operating system platform 217 for managing communication resources and processes in the directory terminal 104.

In one embodiment, the data memory 220 contains a contacts database 222 and a wireless communication device screen interface database 224. The contacts database 222 contains contact records for a plurality of contacts (e.g., occupants of a building in which the directory terminal 104 is located). Each contact record contains the name of a corresponding contact and at least one contact entry. Each contact entry may be a telephone number, an email address, an instant messaging (IM) address, a pager number, a group identifier, a universal fleet member identifier (UFMI), or a dispatch number.

Additionally, or alternatively, the contacts database 222 and the wireless communication device screen interface database 224, or portions thereof, may be contained on a removable storage media 238 (e.g., a memory stick, a USB flash drive, a compact disc (CD), a digital video disk (DVD), a floppy disk, or any other portable data storage device), which is read by a removable storage media reader 212 functioning under the command of the controller/processor 202. Alternatively, the contacts database 222 and the wireless communication device screen interface database 224 may be located on the local server 106, on a remote server accessed through the WAN 114, or in any other memory that is accessible by the directory terminal 104.

In one embodiment, the directory terminal 104 also includes a Bluetooth RF module 208 to facilitate wireless communication with other Bluetooth enabled wireless communication devices 102 in a well-known manner. Signals received by the Bluetooth RF module 208 are decoded by the encoder/decoder 236 according to a Bluetooth protocol. Additionally, data to be transmitted using the Bluetooth RF module 208 is first encoded by the encoder/decoder 236 according to a Bluetooth profile. In an alternative embodiment, the Bluetooth RF module 208 may be replaced with any wireless transceiver that facilitates communication over a short-range wireless link with a similarly equipped portable communication device 102. For example, the Bluetooth RF module 208 may be substituted with an IrDA module, an IEEE 802.11 modem, or any other short-range wireless transceiver.

In the event that the directory terminal 104 facilitates voice communications, the terminal 104 may include an audio controller 228, an audio output device (e.g., a speaker 230), and an audio input device (e.g., a microphone 232). In such a case, audio output is controlled by the audio controller 228, which directs audio signals to an internal speaker 230, an external speaker (not shown) or other audio output device. Additionally, audio signals received by the microphone 232 are encoded into data packets according to a predetermined format by the audio controller 228 before further processing or storage. In a further embodiment, the directory terminal 104 may be capable of displaying video, in which case, the directory terminal 104 may include a video controller 234 to process video information (e.g., received from the LAN access point 108 or stored the data memory 220) and display the information to the display screen 101.

Additionally, the directory terminal 104 may optionally include a telephone, cable, or satellite modem 226 for placing phone calls or accessing the WAN 114, in accordance with one embodiment of the present invention. Further, the directory terminal 104 may be alternatively configured to place telephone calls using a Voice-over-IP implementation through the LAN access point 108.

Figure 3:
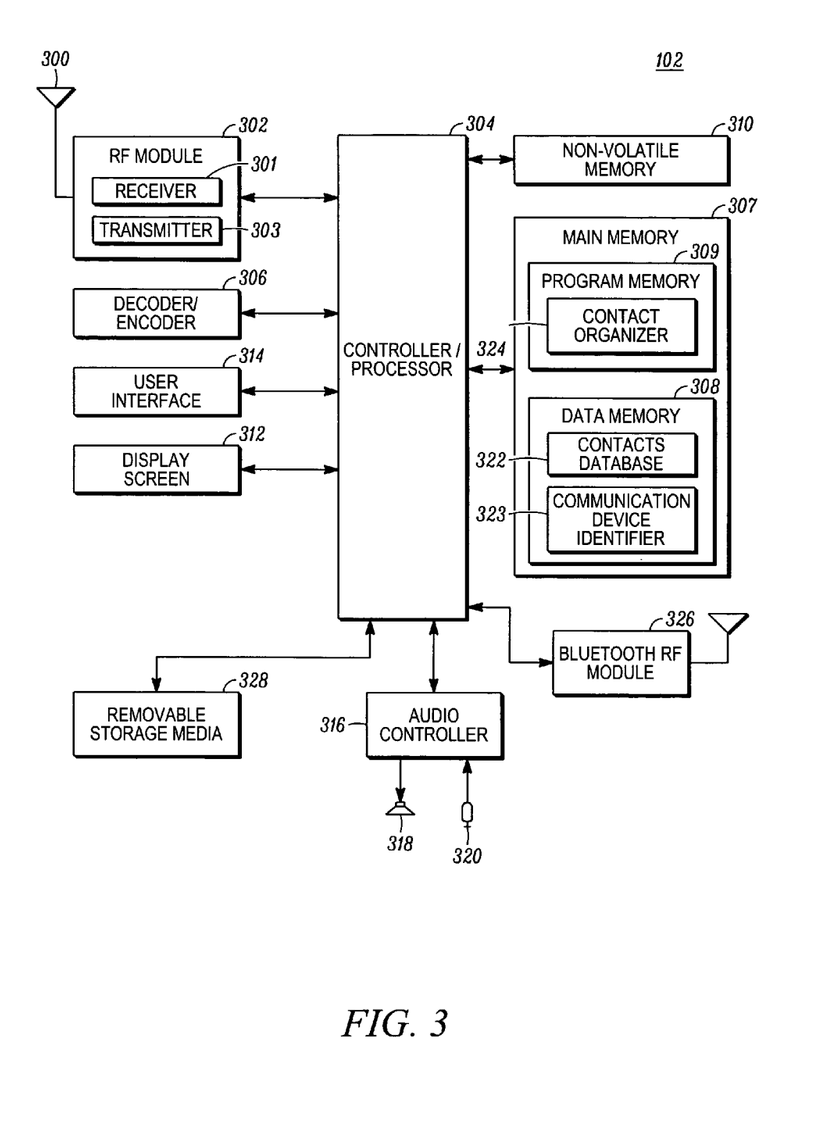
FIG. 3 is a block diagram illustrating a mobile communication device of the system of FIG. 1, according to an exemplary embodiment of the present invention.

FIG. 3 illustrates an electrical block diagram of an exemplary portable communication device 102, according to one embodiment of the present invention. The portable communication device 102 includes a controller/processor 304, which controls the operation of the device 102 according to computer instructions stored in program memory 309. The portable communication device 102 also includes a non-volatile memory 310 and a main memory 307. In one embodiment, the main memory 307 includes the program memory 309 and a data memory 308. A contact organizer 324, which is discussed in greater detail below, is contained in the program memory 309. The data memory 308 contains a contact database 322 and a communication device identifier 323. Similar to the directory terminal's contacts database 222, the contacts database 322 of the portable communication device 102 contains contact records for a plurality of contacts, wherein each contact record contains the name of the corresponding contact and at least one contact entry. Each contact entry may be a telephone number, an email address, an IM address, a pager number, a group identifier, a universal fleet member identifier (UFMI), or a dispatch number. Additionally, or alternatively, the contact organizer 324 and/or the contacts database 322 may be contained on a removable storage media 328 (e.g., a subscriber interface module (SIM) card, a memory stick, a USB flash drive, or any other portable data storage device), which also functions under the command of the controller/processor 304.

In one exemplary embodiment, the communication device identifier 323 is a unique code identifying the manufacturer and the model number of the portable communication device 102. For example, the communication device identifier 323 may be a serial number of the portable communication device 102. In an alternative embodiment, the communication device identifier 323 may identify only the manufacturer of the portable communication device 102 or may identify the portable device manufacturer as well as a family of wireless devices that includes the portable communication device 102. The communication device identifier is used to allow the directory terminal 104 to retrieve a display context or environment similar to the display environment of the portable communication device 102, as described in more detail below.

The wireless communication device 102 transmits and receives signals for enabling wireless communication, such as for a cellular telephone, in a well-known manner. For example, when the wireless communication device 102 is in a "receive" mode, the controller/processor 304 operates an RF module 302, which couples an RF signal from the antenna 300 to a receiver 301 in a well known manner. The receiver 301 receives, converts, and demodulates the RF signal, providing a stream of data to the decoder/encoder module 306. The decoder/encoder module 306 decodes the received data, which the controller/processor 304 outputs to a user in a prescribed manner. For example, audio signals are routed through an audio controller 316 to a speaker 318 or other audio output device. Additionally, received textual or image data is presented to the user on a display screen 312. A receive operational sequence is normally under the control of the controller/processor 304 operating in accordance with computer instructions stored in the program memory 309, in a well-known manner.

In a "transmit" mode, the controller/processor 304, for example, responding to a user input (such as a user selecting a contact from a contact list using a user interface 314), manages the audio controller 316 and couples electronic audio signals from an audio transducer of a microphone 320 to the decoder/encoder module 306, where the audio signals are converted to an encoded data stream for transmission. The controller/processor 304 enables the transmitter circuit 303, which modulates the encoded data onto an RF carrier signal, couples the signal through the antenna 300, and transmits the signal through the wireless communication system 100 in a manner well-known in the art.

The portable communication device 102 also includes a Bluetooth RF Module 326 or another module or modem that facilitates short-range wireless communications with similarly enabled wireless devices, such as the directory terminal 104. Signals received by the Bluetooth RF module 326 are decoded by the encoder/decoder 306 according to a Bluetooth protocol. Additionally, data to be transmitted using the Bluetooth RF module 326 is first encoded by the encoder/decoder 306 according to a Bluetooth profile. In an alternative embodiment, the Bluetooth RF module 326 may be replaced with any wireless transceiver that facilitates communication over a short-range wireless link with a similarly equipped wireless device. For example, the Bluetooth RF module 326 may be substituted with an IrDA module, an IEEE 802.11 modem, or any other short-range wireless transceiver.

Figure 4:
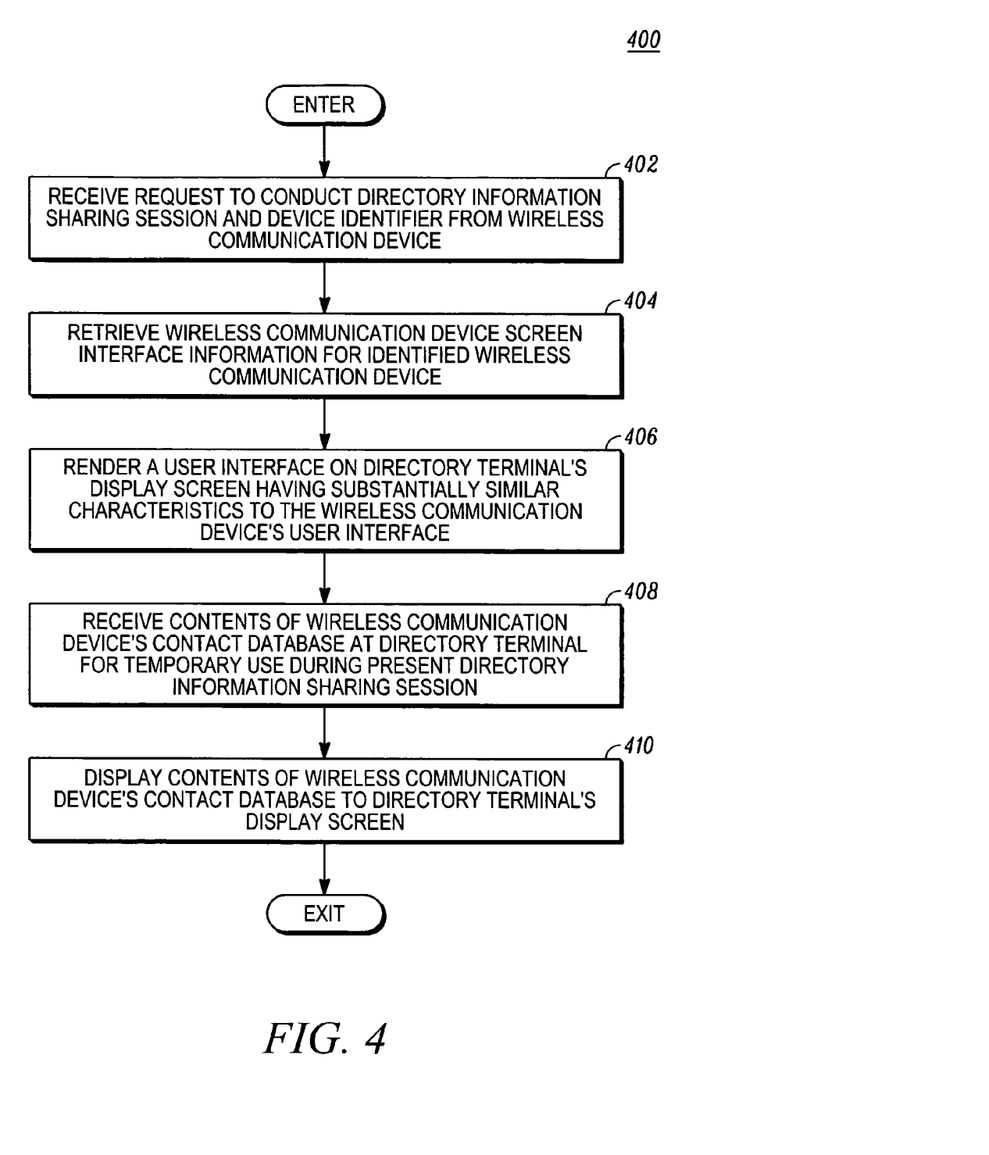
FIGS. 4-7 are logic flow diagrams of various steps executed by a directory terminal and/or a portable communication device to implement a method for coordinating the sharing of contact information and providing enhanced user interface context features, in accordance with exemplary embodiments of the present invention.

FIG. 4 illustrates an exemplary logic flow diagram 400 executed by the directory terminal 104 to implement a method for coordinating the sharing of one or more contacts between the directory terminal 104 and the portable communication device 102, in accordance with one embodiment of the present invention. The directory terminal 104 is generally located in a common area of a corporate facility, office building, or other commercial venue open to public access. The Bluetooth RF module 208 or other short-range wireless module or modem of the directory terminal 104 continuously scans and searches for other wireless devices that are similarly equipped and within communication range. In one embodiment, identifications of devices that are in range are displayed as a listing on the display screen 101. The viewable list of wireless devices changes depending on the devices that are currently in range of the directory terminal's short-range transceiver.

When a visitor enters the common area carrying a portable communication device 102 having short-range communication capability and the portable communication device 102 comes within a range of the directory terminal 104 that is necessary for short-range, wireless communication with the directory terminal 104, the visitor can request that a contact or directory information sharing session be commenced between the directory terminal 104 and the portable communication device 102. The request may be made either wirelessly via the portable communication device's Bluetooth RF module 208 or by user selection of the name or other identity of the visitor's portable communication device 102 as presented on the display screen 101 of the directory terminal 104. For instance, for a directory terminal 104 enabled with Bluetooth capabilities, the listing of available devices on the directory terminal's display screen 101 may include a "friendly name" for each portable communication device's Bluetooth device so that a user can easily select his or her device and request further communication with the directory terminal 104. At step 402, the directory terminal 104 receives the request, along with a communication device identifier 323 for the portable communication device 102 informing the communication director 218, or other equivalent software module of the directory terminal 104, as to an identity (e.g., manufacturer and model number) of the portable communication device 102.

At step 404, the communication director 218 retrieves screen interface information corresponding to the received communication device identifier 323 from a wireless communication device screen interface database 224 containing user interface configurations for a selection of different wireless devices 102. In the embodiment depicted in FIG. 2, the wireless communication device screen interface database 224 is located in the data memory 220 of the directory terminal 104. Such database 224 is populated with the user interface configurations for the selection of different wireless devices 102 either before use of the directory terminal 104 in accordance with the present invention or during use of the directory terminal 104 in accordance with the present invention through automatic retrieval of the user interface configurations (e.g., by the controller/processor 202) from one or more remote servers over the WAN 114.

At step 406, the communication director 218 uses the retrieved screen interface information to render a graphical or other user interface on the display screen 101 of the directory terminal 104. In one embodiment, the rendered user interface is substantially similar to the user interface of the portable communication device 102. In other words, in this embodiment, the rendered or displayed user interface has substantially the same "look and feel" of the user interface displayed on the portable communication device 102 so that the user of the directory terminal 104 (and the portable communication device 102) is already familiar with the way the menu selections and other displayed information are presented and is comfortable enough with the presentation to navigate throughout the interface with minimal confusion or frustration.

Next, at step 408, the communication director 218 receives the contents of the portable communication device contacts database 322 for temporary use by the directory terminal 104 during the directory sharing session. The portable device's contacts database 322 is conveyed to the directory terminal 104 over the short-range wireless (e.g., Bluetooth) link as part of the contacts or directory sharing session. For privacy purposes, the contents of the portable communication device's contacts database 322 should not be stored by the directory terminal 104 without some form of privacy protection (e.g., encryption). The contents of the portable communication device's contacts database 322 are displayed to the directory terminal's display screen 101, at step 410. For the remainder of the directory sharing session, the user may interact with the user interface of the directory terminal 104 in the same manner as he/she would operate the portable communication device 102 user interface. For example, the user can scroll through the contacts database 322, initiate communications, search the database 322, and perform any function that would normally be executed by the portable communication device 102.

Additionally, or alternatively, the communication director 218 may display the contents of the directory terminal's contacts database 222 to the display screen 101 of the directory terminal 104 for use during the directory sharing session. The directory terminal's contacts database 222 may be displayed as a separate user-selectable contacts list, or may be merged with the contents of the contacts database 322 of the portable communication device 102 and displayed as one inclusive contacts list.

Figure 5:
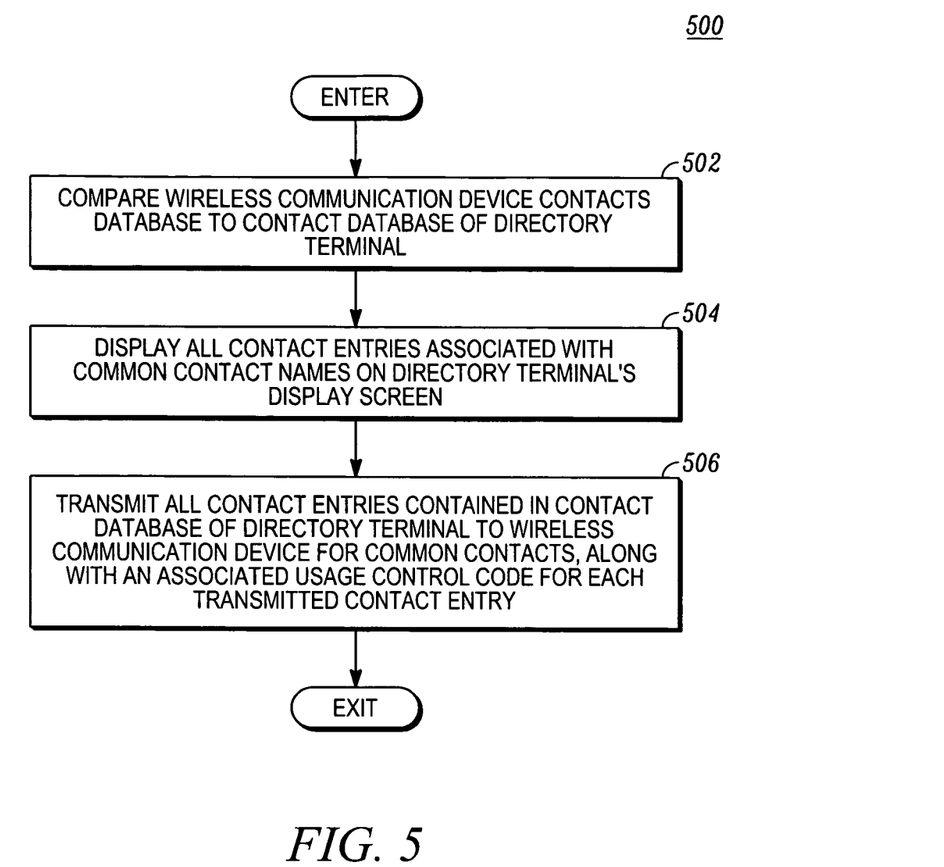

In a further embodiment of the present invention, as illustrated in the exemplary logic flow diagram 500 of FIG. 5, the communication director 218 compares the contact records of the portable communication device's contacts database 322 with the contact records of the directory terminal's contacts database 222 to find any contact records associated with the same contact name, at step 502. At step 504, for any contact having contact records in both contacts databases 222, 322, all corresponding contact entries are displayed to the directory terminal's display screen 101. The communication director 218 may be programmed to list only contact records common to both databases 222, 322. In other words, the communication director 218 may exclude from display any contact record from the first set that includes a contact name for which there is no corresponding contact name in any contact record of the second set. Alternatively, the communication director 218 may display a master contacts list containing one listing for the common contact name that includes all the corresponding contact entries from the appropriate contact records of both databases 222, 322 (e.g., display any contact entry contained in any contact record of the second set that includes a contact name for which there is a corresponding contact name included in any contact record of the first set).

Additionally or alternatively, at step 506, all or some of the contact records contained in the contacts database 222 of the directory terminal 104 may be transmitted to the portable communication device 102, along with an associated usage control code for each transmitted contact record. Alternatively, the only contact entries transmitted by the directory terminal 104 may be those entries contained in contact records stored in the directory terminal's contacts database 222 for which there are related contact records containing the same contact names stored in the portable communication device's contacts database 322. For example, a contact named "John" may have a contact record in both contacts databases 222, 322, but different phone numbers are stored as entries in the two records. As a result of this embodiment, the new contact entry information included in the directory terminal's contacts database 222 is transmitted to the portable communication device 102 for storage in its contacts database 322.

Figure 6:
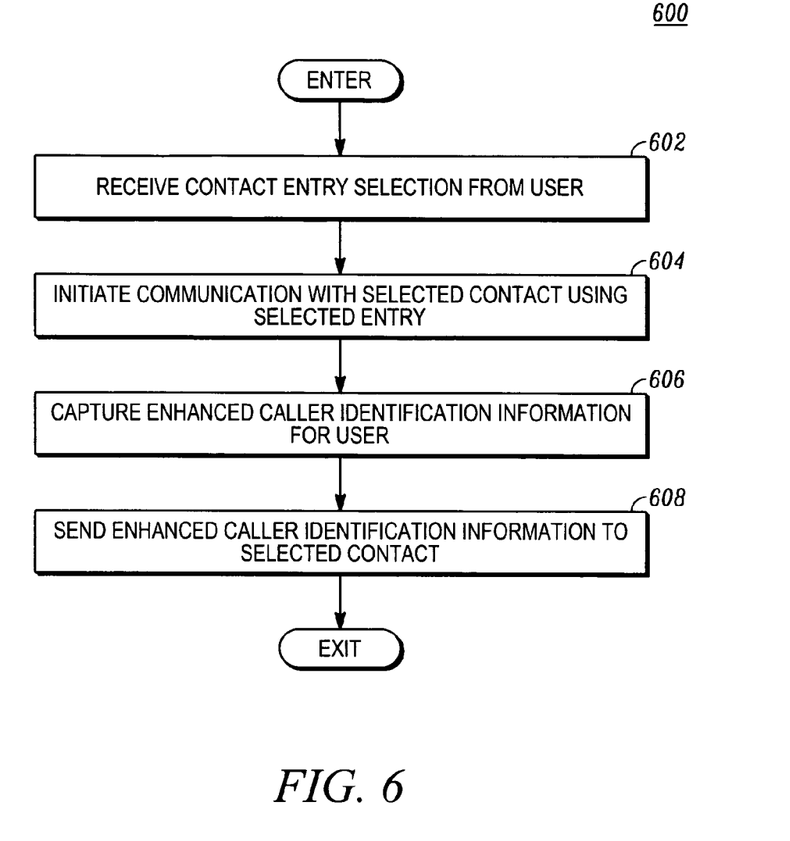

Referring now to FIG. 6, an exemplary logic flow diagram 600 of steps executed by a directory terminal 104 to use contact record entries coordinated and shared between the directory terminal 104 and a portable communication device 102 is illustrated, in accordance with another embodiment of the present invention. After the contact records of either contacts database 222, 322, or any combination of any portion of both contacts databases 222, 322, have been displayed on the display screen 101 of the directory terminal 104, a user may select a desired contact entry to communicate with the corresponding contact using a variety of well-known methods, such as pressing the selection on a touch screen display, clicking the selection using a mouse, or tabbing to the desired contact entry and pressing "ENTER" using a keyboard. At step 602, the communication director 218 receives the contact entry selection from the user, and at step 604, initiates a communication with the selected contact using the selected entry. For example, if the user selects a phone number for the contact, the communication director 218 initiates a phone call to the selected phone number. The communication may be a telephone call, a dispatch call, a page, a text message, an email message, an instant message, or a multi-media message.

The communication director 218 may also capture enhanced caller identification (ID) information concerning the user, at step 606, such as the user's name or phone number, a textual message, an audio recording using the directory terminal's microphone 232 or the portable communication device's microphone, or a still video image or a video sequence using a camera 107 integrated into or coupled to the directory terminal 104. The enhanced caller ID information is then sent to the selected contact, at step 608, in association with the initiated communication. The enhanced caller ID information may be presented to the selected contact embedded within an introduction to the communication to enable the contacted party to more readily identify who is calling or visiting, or may be used to automatically provide additional information to a voice mail system. For example, if the visitor selects a contact that is unavailable, the captured information may be included as an introduction to better identify the person leaving a message.

Figure 7:
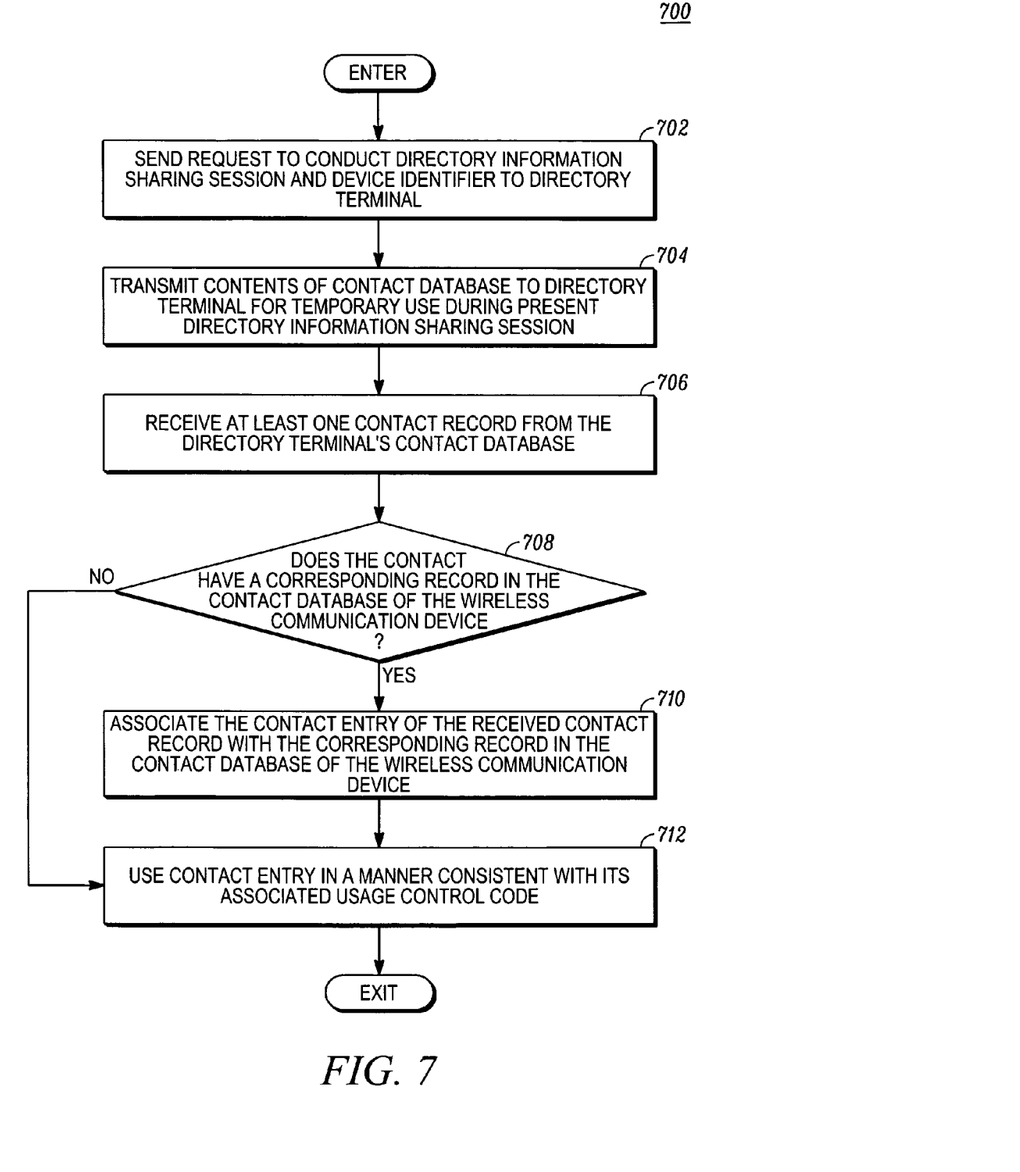

FIG. 7 illustrates an exemplary logic flow diagram 700 of steps executed be a portable communication device 102 to implement a method of coordinating the sharing of contacts between a directory terminal 104 and the portable communication device 102, according to one embodiment of the present invention. In this embodiment, at step 702, the contact organizer 324 of the portable communication device 102 sends, via the Bluetooth or other short-range wireless link, a request to conduct a contact or directory information sharing session, together with a communication device identifier, to the directory terminal 104. At step 704, the portable communication device 102 transmits the contents (contact records)

of its contacts database 322 to the directory terminal 104 for temporary use during the directory information sharing session.

Next, at step 706, the portable communication device 102 receives from the directory terminal 104 at least one contact record that is contained in the directory terminal's contacts database 222. If, at step 708, the contact name in the received contact record is not included in any contact record of the portable communication device contacts database 322, then the user may now proceed to use the new contact entry in a manner consistent with any associated usage control code, at step 712. However, if the contact name in the received contact record matches a contact name included in any contact record of the portable communication device's contacts database 322, then all contact entries in the received contact record, or at least those contact entries that are different than the contact entries in the corresponding contact record stored in the portable communication device 102, are automatically associated with the corresponding contact record in the portable communication device's contacts database 322, at step 710, to thereby update the contact entries for the portable communication devices' contact record. For example, assume for purposes of illustration that a person named "John" has a contact record in both the portable communication device's contacts database 322 and the directory terminal's contacts database 222. In the portable communication device's contacts database 322, the contact entries in John's contact record include an email address (e.g., john@someaddress.com) and a home telephone number (e.g., 555-111-2222); whereas, in the directory terminal's contacts database 222, the single contact entry in John's contact record is a work telephone number (e.g., 333-444-7777). In such a case, at step 706, the portable communication device 102 receives the contact record containing John's work telephone number from the directory terminal 104. Continuing the example, after receiving the new contact entry to for John from the directory terminal 104, the portable communication device 102, at step 710, associates the work telephone number for John with (e.g., adds the work telephone number for John to) John's contact record in the portable communication device's contacts database 322, such that John's contact record in the portable communication device's contacts database 322 now includes three contact entries, namely, an email address, a home telephone number, and a work telephone number.

At step 712, the user of the portable communication device 102 is allowed access to the new contact entry received from the directory terminal 104 in a manner consistent with its associated usage control code if such a usage control code was communicated to the portable communication device 102 in association with the transferred contact entry. For example, the usage control code may indicate that the contact entry is valid for an unlimited time. In this instance, the associated contact entry is stored in the portable communication device contacts database 322, with no restrictions, as part of the contact record for the associated contact name. Alternatively, the usage control code may limit use of the new contact entry to the duration of the present directory sharing session only and require the portable communication device to discard or delete the new contact entry after the session is completed or interrupted. In another embodiment, the usage control code may require that the contact entry expire after a predetermined length of time, in which case, the contact entry is stored in the portable communication device's contacts database 322 temporarily and is then deleted therefrom after a specified length of time. In yet another embodiment, the usage control code may limit use of the received contact entry to only those times in which the portable communication device 102 is in communication with the directory terminal 104. In such a case, the contact entry is stored in the portable communication device's contacts database 322 as part of the contact record for the associated name, but the received contact entry is only accessible to the user when the portable communication device 102 is within wireless communication range of the directory terminal 104.

Additionally, in accordance with yet another embodiment of the present invention, the newly received contact entry may be displayed to the user of the portable communication device 102 only as an icon in order to protect privacy interest. In this case, the user of the portable communication device 102 may select the icon to initiate a communication with the selected contact; however, the actual content of the contact entry is not revealed.

As described above, the present invention encompasses a method for coordinating the sharing of contacts between a directory terminal and a portable communication device, as well as enhancing context features of the directory terminal's user interface based on context features of the portable communication device's user interface. With this invention, a user of a portable, wireless communication device and a directory terminal can quickly access contact information contained in or accessible by the directory terminal by conforming the "look and feel" of the directory terminal's user interface to the "look and feel" of the portable communication device's user interface. Additionally, contact information for a common contact stored in both the portable communication device and the directory terminal may be automatically updated in the portable communication device to include any new or different contact entries that are stored in the directory terminal or a database accessible by the directory terminal. Finally, the directory terminal may provide enhanced caller ID information to a call recipient, thereby allowing the recipient to more quickly and easily identify the caller.

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention.

Benefits, other advantages, and solutions to problems have been described above with regard to specific embodiments of the present invention. However, the benefits, advantages, solutions to problems, and any element(s) that may cause or result in such benefits, advantages, or solutions to become more pronounced are not to be construed as a critical, required, or essential feature or element of any or all the claims. The invention is defined solely by the appended claims including any amendments made during the pendency of this application and all equivalents of those claims as issued.

What is claimed:

1. A method for a directory terminal to coordinate sharing of one or more contacts between the directory terminal and a portable communication device, the method comprising:

receiving, from the portable communication device via a short-range wireless link, a communication device identifier and a request to conduct a directory sharing session with the portable communication device;

retrieving a user interface configuration for the portable communication device based on the communication device identifier, the retrieved user interface configuration defining a look and feel for a user interface of the portable communication device; and rendering a user interface on a display screen of the directory terminal based on the retrieved user interface configuration such that the rendered user interface is usable during the directory sharing session and has a look and feel that is substantially similar to the look and feel of the user interface of the portable communication device.

2. The method of claim 1, further comprising:

receiving a first set of contact records from the portable communication device, each contact record of the first set being associated with a corresponding one of the contacts and including a contact name and at least one contact entry; and displaying the first set of contact records on the display screen of the directory terminal.

3. The method of claim 2, wherein the at least one contact entry comprises at least one of a telephone number, an email address, an instant messaging address, a pager number, a group identifier, a universal fleet member identifier (UFMI), and a dispatch number.

4. The method of claim 1, further comprising:

receiving a first set of contact records from the portable communication device, each contact record of the first set being associated with a corresponding one of the contacts and including a contact name and at least one contact entry;

combining the first set of contact records with a second set of contacts records to form a combined set of contact records, the second set of contact records being stored in a memory accessible by the directory terminal; and displaying the combined set of contact records on the display screen of the directory terminal.

5. The method of claim 1, further comprising:

receiving a first set of contact records from the portable communication device, each contact record of the first set being associated with a corresponding one of the contacts and including a contact name and at least one contact entry;

combining the first set of contact records with a second set of contacts records to form a combined set of contact records, the second set of contact records being stored in a memory accessible by the directory terminal;

displaying the combined set of contact records on the display screen of the directory terminal;

receiving, from a user of the directory terminal, a selection of a contact entry from a displayed contact record to produce a selected contact entry; and initiating a communication with a contact corresponding to the selected contact entry.

6. The method of claim 5, further comprising:

capturing information identifying the user of the directory terminal to produce captured information; and forwarding the captured information to the contact corresponding to the selected contact entry.

7. The method of claim 6, wherein the captured information is at least one of a name, a telephone number, textual information, audio information, and video information.

8. The method of claim 1, further comprising:

receiving a first set of contact records from the portable communication device, each contact record of the first set being associated with a corresponding one of the contacts and including a contact name and at least one contact entry;

searching a second set of contact records stored in a memory accessible by the directory terminal to find at least one contact record containing a contact name corresponding to a contact name contained in at least one contact record of the first set of contact records, each contact record of the second set including a contact name and at least one contact entry; and excluding from display any contact record from the first set including a contact name for which there is no corresponding contact name included in any contact record of the second set.

9. The method of claim 1, further comprising:

receiving a first set of contact records from the portable communication device, each contact record of the first set being associated with a corresponding one of the contacts and including a contact name and at least one contact entry;

searching a second set of contact records stored in a memory accessible by the directory terminal to find at least one contact record containing a contact name corresponding to a contact name contained in at least one contact record of the first set of contact records, each contact record of the second set including a contact name and at least one contact entry; and displaying any contact entry contained in any contact record of the second set that includes a contact name for which there is a corresponding contact name included in any contact record of the first set.

10. The method of claim 1, further comprising:

receiving a first set of contact records from the portable communication device, each contact record of the first set being associated with a corresponding one of the contacts and including a contact name and at least one contact entry;

searching a second set of contact records stored in a memory accessible by the directory terminal to find at least one contact record containing a contact name corresponding to a contact name contained in at least one contact record of the first set of contact records, each contact record of the second set including a contact name and at least one contact entry;

displaying any contact entry contained in any contact record of the second set that includes a contact name for which there is a corresponding contact name included in any contact record of the first set;

receiving a selection of a displayed contact entry from a user of the directory terminal to produce a selected contact entry; and initiating a communication with a contact corresponding to the selected contact entry.

11. The method of claim 10, wherein the communication is one of a telephone call, a dispatch call, a page, a text message, an email message, an instant message, and a multi-media message.

12. The method of claim 1, further comprising:

receiving a first set of contact records from the portable communication device, each contact record of the first set being associated with a corresponding one of the contacts and including a contact name and at least one contact entry;

searching a second set of contact records stored in a memory accessible by the directory terminal to find at least one contact record containing a contact name corresponding to a contact name contained in at least one contact record of the first set of contact records, each contact record of the second set including a contact name and at least one contact entry;

displaying any contact entry contained in any contact record of the second set that includes a contact name for which there is a corresponding contact name included in any contact record of the first set; and sending at least one contact entry contained in the second set to the portable communication device to produce at least one sent contact entry.

13. The method of claim 12, further comprising:

sending a usage control code associated with the at least one sent contact entry to the portable communication device, the usage control code establishing a duration of accessibility for the at least one sent contact entry by the portable communication device, wherein the duration of accessibility is one of an unlimited time, a time limited to a duration of the directory sharing session, a predetermined length of time, and times corresponding to whenever the portable wireless device is in communication with the directory terminal.

14. A method for a directory terminal to coordinate sharing of one or more contacts between the directory terminal and a portable communication device, the method comprising:

receiving a request to conduct a directory sharing session with the portable communication device;

receiving a communication device identifier from the portable communication device, the communication device identifier identifying at least the communication device;

establishing the directory sharing session;

retrieving screen interface information associated with the communication device identifier;

rendering a user interface on a display screen of the directory terminal, the user interface being based on the screen interface information;

receiving a first set of contact records from the portable communication device, each contact record of the first set being associated with a corresponding one of the contacts and including a contact name and at least one contact entry;

searching a second set of contact records stored in a memory accessible by the directory terminal to find at least one contact record containing a contact name corresponding to a contact name contained in at least one contact record of the first set of contact records, each contact record of the second set including a contact name and at least one contact entry;

sending at least one contact entry contained in the second set to the portable communication device to produce at least one sent contact entry; and sending a usage control code associated with the at least one sent contact entry to the portable communication device, the usage control code establishing a duration of accessibility for the at least one sent contact entry by the portable communication device, wherein the duration of accessibility is one of an unlimited time, a time limited to a duration of the directory sharing session, a predetermined length of time, and times corresponding to whenever the portable wireless device is in communication with the directory terminal.

15. A method for a portable communication device to coordinate sharing of contact information for one or more contacts between a directory terminal and the portable communication device, the directory terminal being located at a building visited by a user of the portable communication device and providing directory assistance with respect to occupants of the building, the portable communication device facilitating wireless communications over a wide area system that includes at least one base station and further facilitating wireless communications over a short-range wireless link, the method comprising:

establishing a directory sharing session with the directory terminal over the short-range wireless link;

sending, via the short-range wireless link, a first set of contact records stored in a memory of the portable communication device to the directory terminal after establishment of the directory sharing session, each contact record of the first set including a respective contact name and at least one respective contact entry providing information for contacting the respective contact name;

responsive to sending the first set of contact records, receiving, via the short-range wireless link, at least one contact record from the directory terminal to produce at least one received contact record, the at least one received contact record forming at least part of a second set of contact records that are stored in a memory accessible by the directory terminal and provide contact information for occupants of the building, the at least one received contact record corresponding to one or more contact records of the first set of contact records and including additional information for contacting one or more contact names of the one or more contact records; and associating the additional information contained in the at least one received contact record with the one or more contact records of the first set of contact records.

16. The method of claim 15, further comprising:

displaying the at least one received contact record on a display screen of the portable communication device.

17. The method of claim 15, wherein a received contact record of the at least one received contact record includes at least one contact entry and a contact name corresponding to a contact name contained in a contact record of the first set, the method further comprising:

automatically associating the at least one contact entry of the received contact record with the contact record of the first set containing the corresponding contact name.

18. The method of claim 15, wherein associating the additional information contained in the at least one received contact record with the one or more contact records of the first set includes automatically associating at least one contact entry of a contact record received from the directory terminal with a contact record of the first set, the received contact record including a contact name corresponding to a contact name contained in the contact record of the first set, the method further comprising:

displaying the at least one contact entry on a display screen of the portable communication device;

receiving a selection of a displayed contact entry from a user of the portable communication device to produce a selected contact entry; and initiating a communication with a contact corresponding to the selected contact entry.

19. The method of claim 15, wherein associating the additional information contained in the at least one received contact record with the one or more contact records of the first set includes automatically associating at least one contact entry of a contact record received from the directory terminal with a contact record of the first set, the received contact record including a contact name corresponding to a contact name contained in the contact record of the first set, the method further comprising:

storing the least one contact entry contained in the received contact record in the contact record of the first set containing the corresponding contact name.

20. The method of claim 15, further comprising:

receiving a usage control code associated with the at least one received contact record, the usage control code determining a duration of accessibility for one or more contact entries of the at least one received contact record, wherein the duration of accessibility is one of an unlimited time, a time limited to a duration of the directory sharing session, a predetermined length of time, and times corresponding to whenever the portable communication device is in communication with the directory terminal.

21. A method for a portable communication device to coordinate sharing of contact information for one or more contacts between a directory terminal and the portable communication device, the method comprising:

establishing a directory sharing session with the directory terminal;

sending a communication device identifier to the directory terminal, the communication device identifier identifying at least the portable communication device;

sending a first set of contact records to the directory terminal, each contact record of the first set being associated with a corresponding one of the contacts and including a contact name and at least one contact entry;

receiving at least one contact record from the directory terminal to produce at least one received contact record, the at least one received contact record forming at least part of a second set of contact records stored in a memory accessible by the directory terminal; and receiving a usage control code associated with the at least one received contact record, the usage control code determining a duration of accessibility for one or more contact entries of the at least one received contact record, wherein the duration of accessibility is one of an unlimited time, a time limited to a duration of the directory sharing session, a predetermined length of time, and times corresponding to whenever the portable communication device is in communication with the directory terminal.

22. A method for coordinating sharing of a plurality of contacts between a directory terminal and a portable communication device, the directory terminal being located at a building visited by a user of the portable communication device and providing directory assistance with respect to occupants of the building, the portable communication device facilitating wireless communications over a wide area system that includes at least one base station and further facilitating wireless communications over a short-range wireless link, the method comprising:

transmitting, by the portable communication device via the short-range wireless link, a first set of contact records stored in a memory of the portable communication device, each contact record of the first set being associated with a particular contact of the plurality of contacts and including contact information for the particular contact;

receiving, by the directory terminal via the short-range wireless link, the first set of contact records;

comparing, by the directory terminal, the first set of contact records to a second set of contact records stored in a memory accessible by the directory terminal, each contact record of the second set including contact information for a respective occupant of the building;

determining, by the directory terminal, that a contact record of the second set corresponds to a contact record of the first set;

in the event that contact information contained in the contact record of the second set is different than contact information contained in the corresponding contact record of the first set, transmitting, by the directory terminal via the short-range wireless link, the contact record of the second set containing the different contact information to produce a transmitted contact record; and automatically associating, by the portable communication device, the different contact information contained in the transmitted contact record with the corresponding contact record of the first set.

* * * * *